(12) United States Patent
Hoye

(10) Patent No.: US 9,924,839 B2
(45) Date of Patent: Mar. 27, 2018

(54) PORTABLE FRUIT AND VEGETABLE WASHER

(71) Applicant: Mary Ellen Hoye, Homer Glen, IL (US)

(72) Inventor: Mary Ellen Hoye, Homer Glen, IL (US)

( * ) Notice: Subject to any disclaimer, the term of this patent is extended or adjusted under 35 U.S.C. 154(b) by 242 days.

(21) Appl. No.: 14/939,325

(22) Filed: Nov. 12, 2015

(65) Prior Publication Data

US 2017/0135527 A1    May 18, 2017

(51) Int. Cl.

| | | |
|---|---|---|
| *A23N 12/00* | (2006.01) |
| *B08B 1/00* | (2006.01) |
| *B08B 3/00* | (2006.01) |
| *A47J 43/24* | (2006.01) |
| *A47G 19/30* | (2006.01) |
| *A23B 7/157* | (2006.01) |
| *A23N 12/02* | (2006.01) |

(52) U.S. Cl.
    CPC .................................. *A47J 43/24* (2013.01)

(58) Field of Classification Search
    CPC ......... A47J 43/24; A23N 12/00; A23N 12/02; A23N 12/023; A23N 12/04; B08B 1/00; B08B 1/001; B08B 1/002; B08B 3/00; B08B 3/04; B08B 3/044; B08B 3/10
    USPC ............... 15/3.1, 3.12, 21.1, 94, 96
    See application file for complete search history.

(56) References Cited

U.S. PATENT DOCUMENTS

| | | | | |
|---|---|---|---|---|
| 2,187,891 | A * | 1/1940 | Poluzzi ................. | A23N 12/02 134/199 |
| 2,399,926 | A * | 5/1946 | Hornberger ............ | A47J 43/24 134/153 |
| 3,510,108 | A * | 5/1970 | Yego, Jr. ................ | A23N 12/02 134/200 |
| 4,325,235 | A * | 4/1982 | Bauer ...................... | B05B 1/08 68/181 R |
| 5,064,535 | A * | 11/1991 | Hsu ......................... | A47J 43/24 210/380.1 |
| 6,622,618 | B1 * | 9/2003 | Glucksman ............. | A47J 43/24 210/360.1 |
| 7,278,434 | B2 * | 10/2007 | Huang .................... | A23B 7/157 134/100.1 |
| 7,396,176 | B2 * | 7/2008 | Schoemer ............. | A47G 19/303 118/26 |

(Continued)

*Primary Examiner* — David Walczak
*Assistant Examiner* — Thomas M Abebe
(74) *Attorney, Agent, or Firm* — Clifford H. Kraft

(57) ABSTRACT

A handheld, portable fruit or vegetable washer having washing fluid storage chamber, a washing chamber and a screened cap. Disk or other valves operate between the washing chamber and the fluid storage chamber and between the washing chamber and the screened cap. The fluid storage chamber is typically in the bottom of the washer and holds enough fluid for several washes. Items to be washed are entered into the washing chamber from the removable top while washing fluid is entered by partially opening one of the valves. After closing that valve, agitation is typically accomplished by shaking the unit. After washing, the other valve is opened, and the spent wash fluid can be drained through the screened top. The portable unit is particularly useful for picnics and the like where several different types of items may need different degrees of washing. A removable scrubbing liner can line the washing chamber.

18 Claims, 2 Drawing Sheets

(56) References Cited

U.S. PATENT DOCUMENTS

| | | | |
|---|---|---|---|
| 7,467,718 B1* | 12/2008 | Donohue | A47J 43/24 210/464 |
| 2002/0078983 A1* | 6/2002 | Baccini | A47J 36/08 134/182 |
| 2003/0085234 A1* | 5/2003 | Paumen | A47J 43/24 99/535 |
| 2004/0007258 A1* | 1/2004 | Lasker | A23N 12/02 134/155 |
| 2004/0103552 A1* | 6/2004 | Rhon | A47J 43/24 34/58 |
| 2006/0078661 A1* | 4/2006 | Wang | A23B 7/158 426/521 |
| 2007/0157955 A1* | 7/2007 | Lin | A23B 7/152 134/94.1 |
| 2008/0220135 A1* | 9/2008 | Watzke | B65D 1/24 426/405 |
| 2010/0263555 A1* | 10/2010 | Mah | A47J 43/24 99/495 |
| 2010/0269869 A1* | 10/2010 | Chang | A23B 7/152 134/58 R |
| 2013/0233868 A1* | 9/2013 | Benishai | A47J 43/24 220/661 |
| 2014/0360535 A1* | 12/2014 | Andrus | A47J 43/24 134/25.3 |
| 2016/0227967 A1* | 8/2016 | Cooper | A47J 43/24 |

* cited by examiner

PORTABLE FRUIT AND VEGETABLE WASHER

BACKGROUND

Field of the Invention

The present invention relates to washing devices and more particularly to a portable fruit and vegetable washer.

Description of the Problem Solver

It is well-known that fruit and vegetables as found in the market or even in the field are contaminated by insecticides, dirt and mud, sand, fertilizer and animal wastes. It is therefore very important that all fruits and vegetables be washed before being used or consumed. This is especially true with fruits like apples that are sprayed numerous times with insecticide while on the tree, and where the outer skin my be consumed.

Vegetable washers are known in the art. However, prior art devices have the disadvantage of not being portable, needing to be filed with water or washing fluid just before use, and in general, not handy for picnics and the like.

It would be advantageous to have a portable fruit and vegetable washer that could be taken on a picnic or camping trip, be filled and ready to be used several times without spilling or otherwise being messy.

SUMMARY OF THE INVENTION

The present invention relates to a portable fruit and vegetable washer that includes a handheld washing bottle that is easily handled with a bottom chamber that contains washing fluid, and a strainer top that allows the used fluid to be poured off. A rotating disk acts as a valve on the lower chamber so clean washing fluid can be allowed to enter the washing chamber and then shut off to conserve fluid for the next wash. A second rotating disk acts as a valve on the top of the washing chamber that allows the washing fluid to be drained off after each wash.

The lower chamber is filled with a fruit/vegetable washing fluid mixture, and the lower disk valve is closed. When it is desired to use the unit, the top is unscrewed and removed, the fruit or vegetables to be washed are inserted into the washing chamber from the top, and the top is put back on. The disk valve at the top is closed. The lower disk valve is opened enough to allow some washing fluid to enter the washing chamber. The lower disk valve is then closed. The unit is grasped by the handle, and shaken to agitate the fluid around the fruit or vegetables being washed. The top disk valve is then opened, and the spent washing fluid is poured out the screened top. The washing chamber can then be filled with fresh water for a rinse, the top disk valve closed, and the unit again agitated. The rinse water can be drained in the same manner as the washing fluid. Finally, the top can be removed, and the fruit or vegetables removed. The bottom chamber can typically contain enough wash fluid for several washes. This is a great advantage when some vegetables like potatoes need hard vigorous washing, while delicate fruit like strawberries only need light washing.

DESCRIPTION OF THE FIGURES

Attention is now drawn to one or more figures that illustrates features of the present invention.

One or more drawings has been presented to aid in understanding the present invention. The scope of the present invention is not limited to what is shown in the figure or figures.

DESCRIPTION OF THE PREFERRED EMBODIMENT

Figure 1:
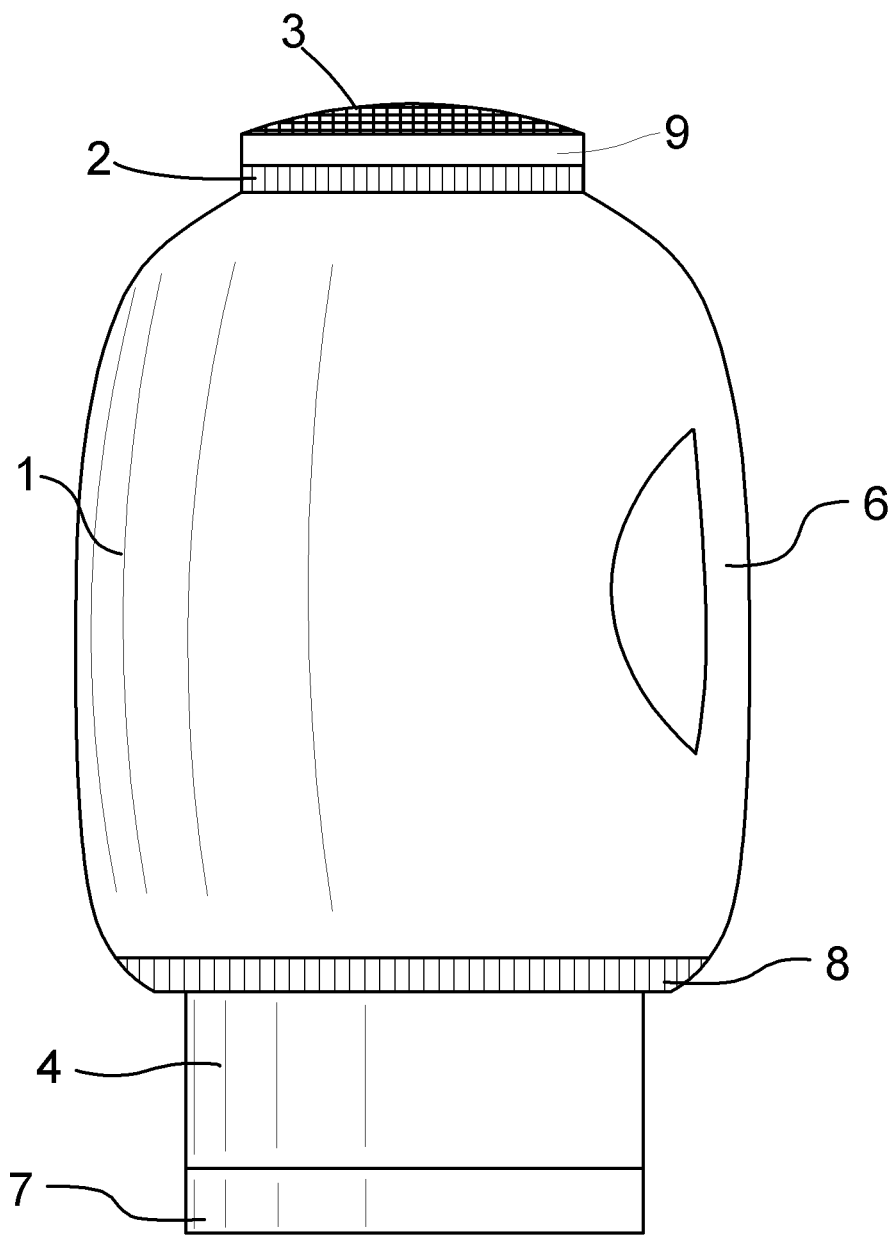
FIG. 1 shows a side view of an embodiment of the present invention.

The present invention relates to a portable fruit or vegetable washer. An embodiment is shown in FIG. 1. A washing chamber 1 attaches to a bottom chamber 4 with a base 7. The base 7 is solid and provides a solid support when the unit is placed upright. The bottom chamber 4 is designed to contain a quantity of washing fluid. The washing fluid can be water with a washing agent dissolved, simply fresh water, or any other washing fluid including fluids designed to remove traces of insecticide.

At the interface between the bottom chamber 4 and the washing chamber 1 is a rotatable disk valve 8 which, when rotated, closes off the bottom chamber 4 from the washing chamber 1, and when opened, allows passage of fluid from the bottom chamber 4 into the washing chamber 1.

The top of the unit has a screw-on cap 9 that closes the washing chamber 1. The cap 9 has a screen cover 3. At the interface between the cap 9 and the washing chamber 1 is a second rotatable disk valve 2. This valve, when closed, seals the washing chamber 1, and when opened, allows the liquid in the washing chamber 1 to be poured out through the screened cover 3. This valve 2 can be attached to either the cap 9 or the washing chamber 1.

In a preferred embodiment, the disk valves include rings that encircle the unit top and bottom. The bottom ring can be located at the top of fluid storage chamber 4. The top ring can be located just below, on, or just above the cap 9 below the screen 3. The rings can have ridges or otherwise have some sort of gripping surface. The valve controls can also be a sliding ring, a lever, or any other type of control.

Figure 2:
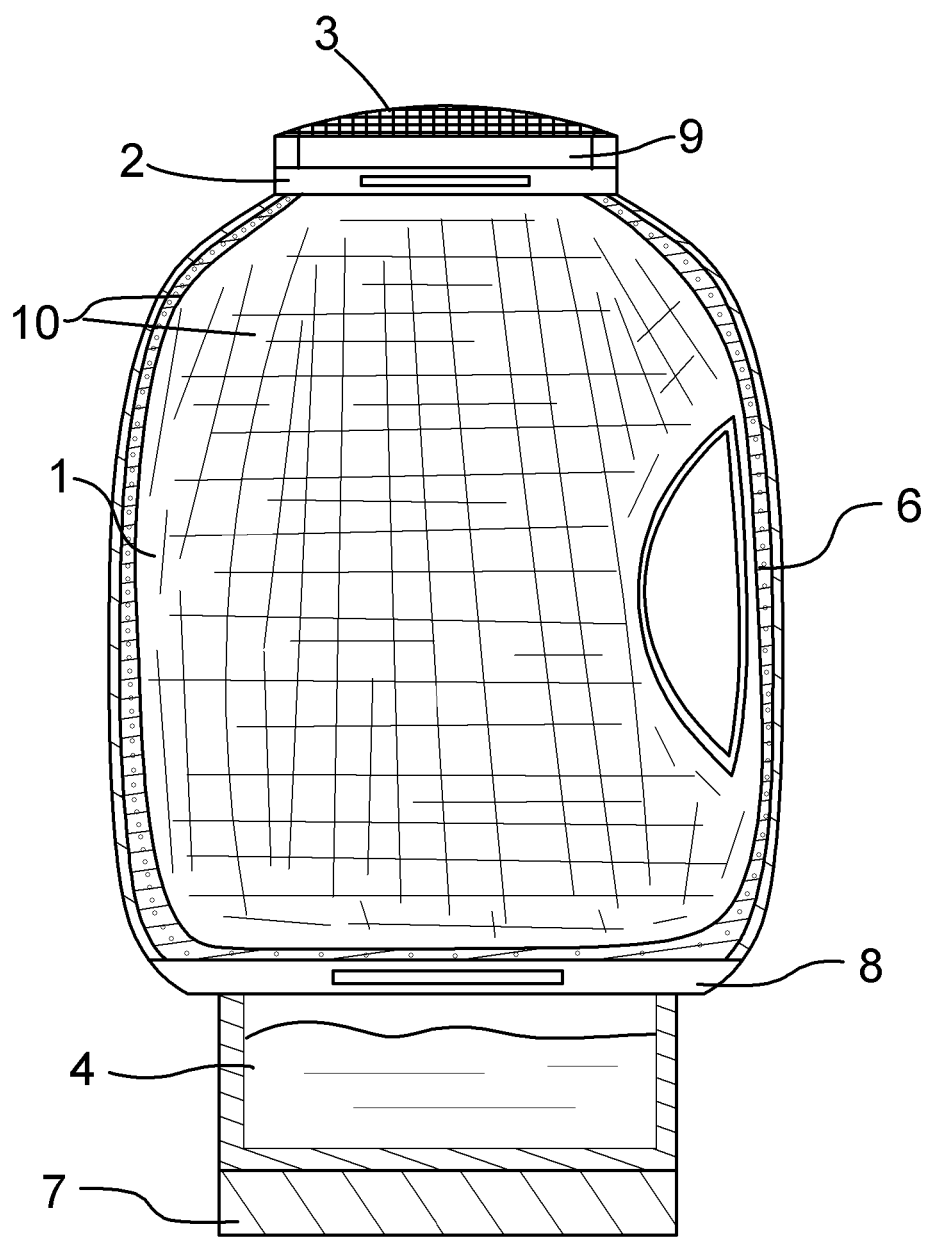
FIG. 2 shows a sectional view of the embodiment of FIG. 1.

FIG. 2 shows a sectional view of the embodiment of FIG. 1. An optional scrubbing cloth or liner 10 can cover the interior surface of the washing chamber 1. This can be removable for cleaning. Also, different degrees of roughness (scrubbing ability) can be chosen by changing clothes. For example, a rough liner 10 can be used for potatoes and carrots, while a fine liner 10 or no liner at all can be chosen for more delicate fruits or vegetables.

A hand-grip 6 on the side of the washing chamber 1 or elsewhere on the unit allows the device to be shaken to agitate the washing fluid with the fruit or vegetable being washed to the amount, and with the intensity, desired.

The entire unit comes apart into cap, washing chamber, and bottom chamber for cleaning and drying.

A user typically fills the lower chamber 4 with washing fluid before using the unit. This can be done, for example, before starting out on a picnic. After filling the lower chamber 4, the lower disk valve 8 is closed. The cap 9 is placed on the device, and the device can be carried or packed without danger of spilling.

When it is desired to wash vegetables or fruit, for example, to make a salad at a picnic, the cap 9 is opened, and the vegetable or fruit is inserted into the washing chamber 1 through the top. The cap 9 is replaced, and the upper disk valve 2 is closed. The lower disk valve 8 can be partially opened, and a chosen amount of washing fluid can be transferred from the lower chamber 4 into the washing chamber 1. The lower disk valve 8 is then closed, and the unit can be shaken or otherwise agitated to wash the contents.

When the washing is complete, the upper disk valve 2 can be opened, and the spent washing fluid drained out the top of the unit through the screened cover 3. The screen 3 prevents any of the fruit or vegetables from leaving the unit. Optionally, fresh water may then be used to partially fill the washing chamber 1, the upper disk valve 8 closed, and the unit again agitated to rinse. Again, the upper disk valve 8 can be opened, and the rinse water poured out. Finally, the cap 9 can be removed, and the washed fruit or vegetables emptied out. The bottom chamber 4 can typically contain enough washing fluid for several washes without refilling.

While, disk valves that use a rotating ring or other device have been described for the upper and lower valves, any type of valve or interface is within the scope of the present invention. The entire unit can be made from a preferred material such as a rigid plastic. Any rigid material is within the scope of the present invention. The hand grip 6 is optional but preferred since it allows easy agitation of the device. Alternate embodiments allow the fruit or vegetables to be entered from the bottom and include a washing fluid chamber on top. Any way of placing or removing fruit or vegetables in or out of the unit is within the scope of the present invention. Any way of filling the washing fluid storage chamber is also within the scope of the present invention.

One very important aspect of the present invention is that it is light, small and handheld.

Several descriptions and illustrations have been presented to aid in understanding the present invention. A person with skill in the art will realize that numerous changes and variations may be made without departing from spirit of the invention. Each of these changes and variations is within the scope of the present invention.

I claim:

1. A handheld, portable fruit or vegetable washer unit comprising:
    a washing chamber mounted over a fluid storage chamber, the washing chamber and fluid storage chamber in fluid communication through first valve operable from outside the unit;
    a screened top removably attachable to the washing chamber, the screened top and the washing chamber in fluid communication through a second valve also operable from outside the unit;
    wherein, the first valve is adapted to allow a portion of stored washing fluid to enter the washing chamber for washing, and the second valve is adapted to allow spent washing fluid to exit the washing chamber after washing is complete;
    and wherein, the unit includes a handle adapted to allow the unit to be gripped and shaken to agitate the washing fluid and wash fruit or vegetables in the washing chamber.

2. The handheld, portable fruit or vegetable washer of claim 1 wherein the first and second valves are disk valves.

3. The handheld, portable fruit or vegetable washer of claim 2 wherein the disk valves include rings that encircle the unit.

4. The handheld, portable fruit or vegetable washer of claim 3 wherein the rings have a ridged or otherwise gripping surface.

5. The handheld, portable fruit or vegetable washer of claim 1 wherein the unit is made from rigid plastic.

6. The handheld, portable fruit or vegetable washer of claim 1 wherein the fluid storage chamber is adapted to hold enough fluid for several washes.

7. The handheld, portable fruit or vegetable washer of claim 1 further comprising a removable scrubbing liner lining the washing chamber.

8. A handheld, portable fruit or vegetable washer unit comprising:
    a washing chamber mounted over a fluid storage chamber, the washing chamber and fluid storage chamber in fluid communication through first valve operable from outside the unit;
    a screened top removably attachable to the washing chamber, the screened top and the washing chamber in fluid communication through a second valve also operable from outside the unit;
    wherein, the first valve is adapted to allow a portion of stored washing fluid to enter the washing chamber for washing, and the second valve is adapted to allow spent washing fluid to exit the washing chamber after washing is complete.

9. The handheld, portable fruit or vegetable washer of claim 8 wherein the first and second valves are disk valves.

10. The handheld, portable fruit or vegetable washer of claim 9 wherein the disk valves include rings that encircle the unit.

11. The handheld, portable fruit or vegetable washer of claim 8 wherein the unit is made from rigid plastic.

12. The handheld, portable fruit or vegetable washer of claim 8 wherein the fluid storage chamber is adapted to hold enough fluid for several washes.

13. The handheld, portable fruit or vegetable washer of claim 8 further comprising a removable scrubbing liner lining the washing chamber.

14. A handheld, portable fruit or vegetable washer device comprising:
    a substantially round elongated washing chamber with a side-mounted handle adapted for hand agitation of the device;
    a cylindrical base containing a fluid storage chamber;
    a removable screw-on screened cap covering the washing chamber;
    a first valve separating the washing chamber from the fluid storage chamber;
    wherein, partially opening the first valve allows washing fluid to enter the washing chamber.

15. The handheld, portable fruit or vegetable washer device of claim 14 further comprising a second valve separating the washing chamber from the screened cap, wherein partially opening the second valve allows spent washing fluid to be poured through the screened cap.

16. The handheld, portable fruit or vegetable washer device of claim 15 wherein the first and second valves are accessible from outside the device.

17. The handheld, portable fruit or vegetable washer device of claim 15 wherein the first and second valves are controlled by rings encircling the device.

18. The handheld, portable fruit or vegetable washer device of claim 14 further comprising a removable scrubbing liner lining the washing chamber.

* * * * *